United States Patent Office 3,481,955
Patented Dec. 2, 1969

3,481,955
ORGANIC NITRATE-BILE ACID
INCLUSION COMPOUNDS
Robert Goldman, Cresskill, N.J., assignor to Nysco Laboratories, Inc., a corporation of New York
No Drawing. Filed Oct. 10, 1967, Ser. No. 674,116
Int. Cl. C07c 169/52; A61k 27/00
U.S. Cl. 260—397.1                                    7 Claims

ABSTRACT OF THE DISCLOSURE

Sparingly water soluble pharmaceutically active organic nitrates can be prepared as inclusion compounds with bile acids thereby enhancing their water solubility. The compounds are more readily and rapidly absorbable. Nitrates include glycerol trinitrate, mannitol hexanitrate pentaerythritol tetranitrate, erythritol tetranitrate, and isosorbide dinirate.

---

This invention relates to novel compositions of matter, and is particularly directed to novel inclusion compounds of pharmaceutically active organic nitrates and bile acids. The invention further relates to a process for the preparation of said novel inclusion compounds and to pharmaceutical compositions comprising said compounds.

Organic nitrates, particularly pentaerythritol tetranitrate, are widely used to bring about the dilation of coronary blood vessels to reduce the incidence or severity of anginal attacks. These drugs are most often administered in the form of tablets or capsules that disintegrate in the digestive tract from which the drug is absorbed into the blood stream.

For any orally administered drug to be useful and active in regions other than the gastrointestinal tract, the body must be capable of absorbing it from the gastrointestinal tract. While much still remains to be discovered about mechanisms of absorption, there are at least two considerations. The drug must be either soluble, or emulsifiable so that association complexes called micelles can form, or capable of being rendered soluble or emulsifiable by the body's digestive processes.

Pentaerythritol tetranitrate is a drug with a very low order of solubility. If it is emulsifiable at all by the body's own resources, it is only accomplished very slowly and with great difficulty. The drug is known to hydrolyze and form inactive compounds by the action of moisture alone, and also is subject to destruction by esterases.

For these reasons and, in addition, out of consideration for the fact that the time the drug spends in the gastrointestinal tract is limited, it is essential that the process of absorption take place relatively promptly. All of these factors very seriously limit the body's ability to absorb the drug and hence limit its activity and usefulness.

Accordingly, it is an object of this invention to provide dosage forms of organic nitrates, particularly pentaerythritol tetranitrate, which will be more readily absorbed from the intestinal tract.

A further object of the invention is to provide novel compounds of organic nitrates which will be readily absorbed from the digestive tract.

Another object is to provide a convenient method for preparing these novel compounds.

I have now found that inclusion compounds of organic nitrates and bile acids are readily absorbed from the digestive tract thereby reducing considerably the time the active drug spends in the tract.

The novel inclusion compounds of the invention are conveniently prepared by dissolving the organic nitrate and the bile acid in an inert solvent in which both compounds are soluble. A minimum amount of solvent is used to effect solution and the desired product crystallizes upon cooling of the solution. In carrying out the reaction, an excess of the bile acid is used. Preferably, the novel inclusion compounds contain the organic nitrate and the bile acid in a molar ratio of 1:2, respectively.

Among the organic nitrates which are suitable in preparing these novel inclusion compounds are glycerol trinitrate, mannitol hexanitrate, pentaerythritol tetranitrate, erythritol tetranitrate and isosorbide dinitrate. Suitable bile acids include desoxycholic acid and apocholic acid.

Suitable solvents in which the reaction may be carried out include acetone, methyl ethyl ketone, methanolbenzene mixtures, and the like.

The novel inclusion compounds of this invention may be administered in the form of compressed tablets or capsules prepared in the customary manner. These capsules or tablets may contain in addition to the active novel inclusion compound the conventional pharmaceutical diluents such as lactose, sucrose, cornstarch, and the like. In preparing the tablets or capsules containing these novel inclusion compounds, it is also possible to prepare the novel compounds in situ in the mixture of materials forming the capsule or tablet.

The invention will be more fully understood from the examples which follow, and it is intended to cover all changes and modifications of the examples of the invention herein chosen for purposes of disclosure which do not depart from the spirit and scope of the invention.

EXAMPLE I 2.35 g. desoxycholic acid and 316 mg. of pentaerythritol tetranitrate are dissolved in 20 ml. of a 1:1 mixture (by volume) of methanol and benzene by gentle heating. As soon as the solids have dissolved, the solution is cooled and refrigerated. The crystals of product obtained on cooling have a melting point of 158–161° C., and analysis shows that the compound has a molar ratio of pentaerythritol tetranitrate:desoxycholic acid of 1:2. From the mother liquor, there was obtained a mixture of inclusion compounds of pentaerythritol tetranitrate and desoxycholic acid wherein the ratio of acid from nitrate ranged from 3:1 to 6:1. This was confirmed by the methods of Rheinboldt, J. Prakt. Chem. 111, 242 (1925) and Sobotka and Goldberg, Biochem. J. 26, 555 (1932).

EXAMPLE II 2.0 kg. of pentaerythritol tetranitrate and 210 kg. of desoxycholic acid were dissolved in a solution of 5 l. of methanol and 5 l. of benzene. 17.4 kg. of cornstarch was added to form a slurry which was then allowed to dry. To this dried material was added 0.4 kg. talc and 0.2 kg. magnesium stearate. The material can be granulated and compressed into tablets weighing about 400 mg. or filled into capsules, each capsule and tablet containing 20 mg. of pentaerythritol tetranitrate in the form of a 1:2 inclusion compound with desoxycholic acid and an excess of desoxycholic acid.

I claim:

1. An inclusion compound of a pharmaceutically active organic nitrate selected from the group consisting of glycerol trinitrate, pentaerythritol tetranitrate, mannitol hexanitrate, erythritol tetranitrate and isosorbide dinitrate and a bile acid.

2. An inclusion compound according to claim 1, where the bile acid is desoxycholic acid or apocholic acid.

3. An inclusion compound according to claim 2, where the organic nitrate is pentaerythritol tetranitrate.

4. An inclusion compound according to claim 3, where the bile acid is desoxycholic acid.

5. An inclusion compound according to claim 4, where the molar ratio of pentaerythritol tetranitrate:desoxycholic acid is 1:2.

6. A process for preparing an inclusion compound according to claim 1, which comprises dissolving the organic nitrate and an excess of bile acid in the minimal amount of an inert organic solvent and cooling to effect precipitation of the product.

7. A process according to claim 6, where the inert organic solvent is a 1:1 mixture by volume of methanol and benzene.

No references cited.

ELBERT L. ROBERTS, Primary Examiner

U.S. Cl. X.R.

260—999